3,342,764
MOISTURE SETTING PRINTING INKS
Arleen S. Varron, Jamaica, and Howard T. Roth, Ridgewood, N.Y., assignors to Interchemical Corporation, New York, N.Y., a corporation of Ohio
No Drawing. Filed Oct. 1, 1962, Ser. No. 227,590
10 Claims. (Cl. 260—22)

This invention is concerned with typographic printing inks of the type which set by moisture precipitation, and aims to provide inks of this general type which are characterized by greatly improved alkali resistance on many types of stock, as compared with standard moisture precipitation inks.

In the field of package printing, typographic inks which set by moisture precipitation have come into extensive use. Such inks are characteristically based on vehicles comprising solutions of hard resins in water-miscible glycol solvents. The inks and methods of printing therewith are disclosed and in Gessler et al. Patent No. 2,157,385, dated May 9, 1939. Such inks contain a water-soluble solvent, usually a glycol having from 2 to 4 carbon atoms or a polyglycol. When water is sprayed upon or otherwise added to a printed film of an ink of this character, it causes the ink binder to be precipitated so that upon evaporation or removal of the solvent and water such as by penetration into the paper, the ink is substantially dry. Fast drying, excellent appearance, and the lack of odor attainable with these inks has been largely responsible for their acceptance by printers of packages and packaging materials.

Because of the requirement that the resin be soluble in the glycol or polyglycol solvents described above, be press stable under ambient conditions (which often involves high humidity) and be precipitable from solution by the addition of water to the printed film, the available resins have been so limited that optimum film properties are not always available in the finished prints.

One major problem which hampers and limits the use of moisture setting printing in the packaging field is that most of the existing moisture setting inks have less than desirable alkali resistance. This shortcoming has greatly restricted the use of moisture setting printing in packaging for most foods which might eventually come in contact with ammonia refrigerants and for soaps and cleansers which, of course, have alkali components. While alkali resistant binders have been found for other types of printing inks, the discovery of alkali resistant binders for moisture setting inks has been very difficult because of the previously mentioned required combination of properties of moisture setting inks.

We have now discovered novel moisture setting inks having excellent alkali resistance. Our novel inks are solutions, in the standard lower glycol and polyglycol solvents of oil fatty acid modified alkyd resins.

The alkyd resins incorporated in our novel moisture setting inks comprise the condensation product of (1) either phthalic acid, phthalic anhydride or isophthalic acid, (2) a polyhydric alcohol having at least 3 hydroxyl groups and (3) an oil fatty acid having at least 12 carbons, said reactants being condensed having an average initial functionality, based upon only hydroxyl and carboxyl groups present, of from 2.0 to 2.4 and at least a 10% excess of hydroxyl groups over carboxyl groups present.

It is considered very surprising to find a class of alkyds which are soluble and stable in the polyglycol and lower glycol solvents of moisture setting inks. While alkyds have been used in coating compositions containing glycol derivatives such as ethers and esters of glycols e.g., ethylene glycol mono-ethyl ether (Cellosolve) or ethylene glycol mono-ethyl ether acetate, it is not believed that they have been used as the sole binder in the glycol or polyglycol solvents of moisture setting inks. Because of a general belief in the art that alkyds were unstable as well as insoluble in the lower glycols and polyglycols, the use of alkyds in moisture setting inks has been limited to use as auxiliary or co-binders with other resins as primary binders. Furthermore, the aforementioned ether and ester glycol derivatives cannot be used as moisture setting ink solvents because they lack water miscibility, are too volatile for press stability and attack rubber rollers used in moisture setting printing apparatus.

The oil fatty acid modified alkyds described in this specification have been found to have excellent solubility and stability in polyglycols and lower glycols.

Suitable oil fatty acids which may be used to modify the alkyds include capric acid, lauric acid, myristic acid, palmitic, stearic, eleostearic, arachidic, behenic and lignoceric acid palmitoleic, oleic, erucic, ricinoleic, linoleic and linolenic acids. Preferably, the oil fatty acids contain at least 12 carbons atoms.

Suitable polyhydric alcohols include glycerol pentaerythritol, dipentaerythritol, trimethylol propane and preferably trimethylol ethane.

It has been further found that particularly good inks have been produced where the initial reactants being condensed to form the alkyd further include 4-4-bis(4-hydroxyphenyl) pentanoic acid. This acid is also known as diphenolic acid and may be prepared by the condensation of phenol and levulinic acid in the presence of a mineral acid such as hydrochloric acid at about 140° F. (see the publication Diphenolic Acid (Technical Data) published by S. C. Johnson and Son, Inc., 1959).

Optionally, the reactants being condensed may further include glycols such as ethylene, propylene, butylene and neopentyl glycol as well as an alpha-beta unsaturated acid such as maleic anhydride or fumaric acid.

In this specification and claims, all proportions are by weight unless otherwise indicated.

There should be an excess of hydroxyl groups in the initial mixture which is to be esterified in making the alkyd, that is the amount of the alcohol components present should be such that preferably a 10% excess of hydroxyl groups over those necessary for esterification are present. This hydroxyl excess may vary up to about 70%. Furthermore, the average functionality based upon hydroxy and carboxyl groups present in the initial mixture to be reacted should be between 2.0 and 2.4, most preferably between 2.1 and 2.3. Average functionality may be calculated as follows:

Average Functionality =

$$\frac{\text{Initial Total Carboxyl plus Hydroxyl Groups Available for Esterification}}{\text{Initial Total Molecules Present}}$$

It is preferable that the acid No. of the alkyd resin is from 10 to 60 with best results being obtained when the acid No. is from 20 to 35.

Of the total carboxyl groups initially present, it is preferable the fatty acid present furnish from 9 to 18% of the total carboxyl content and the phthalic acid, phthalic anhydride or isophthalic acid furnish from 24% to 91% of the carboxyl content. When present 4,4-bis(4-hydroxylphenyl) pentanoic acid preferably furnishes from 8 to 18% of the carboxyl content.

The following examples are typical of our invention:

Example I

| | | Weight, g. | Ratio of Equivalents |
|---|---|---|---|
| A | 1,3 Butylene glycol | 308 | 2.28 (OH). |
| B | Trimethylol ethane | 212 | 1.77 (OH). |
| C | Pentek (technical grade of pentaerythritol containing 88% pentaerythritol and 12% dipentaerythritol). | 216 | 200 (OH). |
| D | Ricinoleic acid | 666 | 0.75 (COOH). |
| E | Isophthalic acid | 975 | 4.00 (COOH) combined. |
| F | Fumaric acid | 21 | |
| G | 4,4-bis(4-hydroxyphenyl) pentanoic acid. | 644 | 0.75 (COOH). |

Ingredients A, B, C and D are heated under an inert atmosphere and refluxed to about 162° C. for a period of 50 minutes. Ingredients E and F are added over a period of 10 to 15 minutes and the temperature is then slowly raised to about 225° C. over a 2½ hour period. The mixture is heated at said last temperature until an acid No. of 60-65 is reached (about 1½ hours). Ingredient G is then added over a period of 15 minutes while the temperature is maintained at 225° C. The mixture is maintained at 225° C. until the acid No. drops below 30. The alkyd resin produced has a softening point (mercury method) of 96° to 103° C., an acid No. of 29 and a viscosity of 1300-1320 p. at 30° C.

Example II

| | | Weight, g. | Ratio of Equivalents |
|---|---|---|---|
| A | Trimethylol ethane | 486 | 4.05 (OH). |
| B | Pentek | 216 | 2.00 (OH). |
| C | Ricinoleic acid | 888 | 1.00 (COOH). |
| D | Phthalic anhydride | 870 | 4.00 (COOH). |
| E | Fumaric acid | 18 | |
| F | 4,4-bis(4-hydroxyphenyl) pentanoic acid. | 429 | 0.50 (COOH). |

Ingredients A, B, C, D and E are heated under an inert atmosphere for 2 hours at 220°–225° C. or until an acid No. of 50 is reached. Ingredient F is added and the temperature is maintained at 220–225° C. until an acid No. of 33 is reached.

Example III

| | | Weight, g. | Ratio of Equivalents |
|---|---|---|---|
| A | Trimethylol ethane | 252 | 6.3 (OH). |
| B | Soya oil fatty acids | 280 | 1.0 (COOH). |
| C | Phthalic anhydride | 295 | 4.0 (COOH). |
| D | 4,4-bis(4-hydroxyphenyl) pentanoic acid. | 143 | 0.5 (COOH). |

Ingredients A, B and C are heated under an inert atmosphere to 220–225° C. over a period of one hour and maintained at said temperature until an acid No. of 40 to 50 is reached. Then D is added and the mixture is maintained at 200°–225° C. until an acid No. of less than 16 is reached. The alkyd product has an acid No. of 14 and a softening point of 69–81° C. (mercury method).

Example IV

| | | Weight, g. | Ratio of Equivalents |
|---|---|---|---|
| A | Neopentyl glycol | 392 | 2.58 (OH). |
| B | Trimethylol ethane | 176.5 | 1.47 (OH). |
| C | Pentek | 216 | 2.00 (OH). |
| D | Ricinoleic acid | 755 | 0.85 (COOH). |
| E | Isophthalic acid | 975 | 4.00 (COOH) combined. |
| F | Fumaric acid | 21 | |
| G | 4,4-bis(4-hydroxyphenyl) penanoic acid. | 558 | 0.65 (COOH). |

Following the procedure of Example I, the above ingredients are reacted to an acid No. of less than 50. The resulting alkyd resin has a softening point of 80°–85° C. (mercury method).

Example V

| | Weight (parts) | Ratio of Equivalents |
|---|---|---|
| Phthalic anhydride | 427 | 5.77 (COOH). |
| Propylene glycol | 164 | 4.43 (OH). |
| Pentek | 208 | 5.76 (OH). |

The above ingredients were heated at a temperature of 175° C. to 200° C. under a $CO_2$ atmosphere for about 4 hours. To the product there is added:

| | Weight (parts) | Ratio of Equivalents |
|---|---|---|
| Soya oil fatty acids | 202 | 0.72 (COOH). | and the mixture is heated for about 1 hour at 210° C. or until the acid No. reaches 21.

Example VI

Example V is repeated using the same conditions but with the following reactants:

| | Weight (parts) | Ratio of Equivalents |
|---|---|---|
| Phthalic anhydride | 572 | 8 (COOH). |
| Propylene glycol | 228 | 6 (OH). |
| Pentek | 228 | 8 (OH). |
| Tung fatty acids | 267 | 0.95 (COOH). |

After the tung fatty acids are added, the mixture is maintained at 175° C. to 200° C. until the acid No. reaches 40.

Example VII

The following ingredients are formulated into a moisture setting ink:

| | Parts |
|---|---|
| The alkyd of Example I | 31.8 |
| Triethylene glycol | 41.6 |
| Phthalocyanine Blue pigment | 26.6 |

The resulting ink has good press stability at relative humidities as high as 60% under standard press-room conditions. In addition, if about 20% of the solvent is replaced with dipropylene glycol, the ink is stable at relative humidities above 65%. A 5% solution of ammonium hydroxide is applied to a film of the ink printed on clay coated board. There is substantially no bleeding of the color except for negligible traces.

Example VIII

The following ingredients are formulated into a moisture setting ink:

| | Parts |
|---|---|
| The alkyd of Example I | 28.6 |
| Triethylene glycol | 37.4 |
| Phthalocyanine Blue pigment | 24.0 |
| Wax compound (microcrystalline) | 10.0 |

The resulting ink has substantially the same press stability and alkali resistance as the ink of Example VII.

Furthermore, the inks of Examples VII and VIII may be formulated using conventional moisture setting printing solvents including propylene glycol, dipropylene glycol, diethylene glycol and tripropylene glycol in place of triethylene glycol.

*Example IX*

An ink is formulated using the same ingredients and proportions as in Example VIII except that the alkyd of Example II is used in place of the alkyd of Example I. The resulting ink has the same desirable properties as does the ink of Example VIII.

*Example X*

An ink is formulated using the same ingredients and proportions as in Example VIII except that the alkyd of Example III is used in place of the alkyd of Example I. The resulting ink has the same desirable properties as does the ink of Example VIII.

*Example XI*

An ink is formulated using the same ingredients and proportions as in Example VIII except that the alkyd of Example IV is used in place of the alkyd of Example I. The resulting ink has the same desirable properties as does the ink of Example VIII.

*Example XII*

The following ingredients are formulated into a moisture setting ink:

| | Parts |
|---|---|
| 55% solution of alkyd of Example V in diethylene glycol | 57 |
| Diethylene glycol | 13 |
| Phthalocyanine Blue pigment | 20 |
| Extender (aluminum hydrite clay) | 10 |

The resulting ink has good press stability at relative humidities as high as 50% under standard press room conditions (temperatures of 75° F.). In addition, if about 20% of the solvent is replaced with dipropylene glycol, the ink is stable at relative humidities above 65%. A 5% solution of ammonium hydroxide is applied to a film of the ink printed on clay coated board. There is substantially no bleed of color.

*Example XIII*

The following ingredients are formulated into a moisture setting ink:

| | Parts |
|---|---|
| 60% solution of alkyd of Example VI in diethylene glycol | 62.7 |
| Pigment comprising 57% titanium dioxide, 26% Chrome Yellow and 17% Alkali Blue | 31.8 |
| Microcrystalline wax | 3.0 |
| Drier (cobalt naphthanate) | 1.0 |
| Lecithin | 1.0 |
| Antioxidant | 0.5 |

The resulting ink has good press stability at relative humidities as high as 60% under standard press room conditions (temperatures of 75° C.). In addition if about 20% of the solvent is replaced with dipropylene glycol, the ink is stable at relative humidities above 70%. A 5% solution of ammonium hydroxide is applied to a film of the ink printed on clay coated board. There is substantially no bleeding of color.

It has been observed that the press stability of the inks of both Examples XII and XIII may be further improved by using either dipropylene glycol or triethylene glycol instead of diethylene glycol.

While we have shown but a few examples of our invention, it is obvious that the examples can be multiplied indefinitely without departing from the scope of our invention as defined in the claims. The inks can be made with all the common pigments, fillers, waxes and other addants conventionally used in moisture-setting inks. Of course, where alkali resistance is required, the pigments used should be pigments known to be unaffected by alkali such as Cadmium Lithopone Yellow, Benzidine Yellow, Naphthol Red, Cadmium Red, Cyan Blue and Cyan Green, and Carbon Black.

While there have been described what is at present considered to be preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A moisture setting printing ink comprising pigment dispersed in a vehicle comprising a solvent selected from the group consisting of water soluble glycols having from 2 to 4 carbons and polyglycols, said solvent having dissolved therein a binder consisting essentially of an alkyd resin comprising the condensation product of (1) a member selected from the group consisting of phthalic acid, phthalic anhydride and isophthalic acid, (2) a polyhydric alcohol having at least 3 hydroxyl groups selected from the group consisting of pentaerythritol, trimethylol propane, trimethylol ethane and glycerol, and (3) an oil fatty acid having at least 12 carbons, said reactants being condensed having an average initial functionality, based upon only hydroxyl and carboxyl groups present, of from 2.0 to 2.4 and at least a 10% excess of hydroxyl groups over carboxyl groups present in said reactants.

2. The moisture setting printing ink of claim 1 wherein said reactants being condensed further include 4,4-bis(4-hydroxyphenyl) pentanoic acid.

3. The printing ink of claim 1 wherein said alkyd further contains a glycol component.

4. The printing ink of claim 1 wherein said alkyd has an acid number of from 15 to 60.

5. The printing ink of claim 2 wherein said reactants being condensed further include an alpha-beta unsaturated dicarboxylic acid.

6. The printing ink of claim 1 wherein said oil fatty acid is tung oil fatty acid.

7. The printing ink of claim 1 wherein said oil fatty acid is soya oil fatty acid.

8. The printing ink of claim 2 wherein said oil fatty acid is ricinoleic acid.

9. An ink according to claim 1 wherein said alkyd resin is the condensation product of phthalic anhydride, propylene glycol, pentaerythritol and tung oil fatty acids.

10. An ink according to claim 2 wherein said alkyd resin is the condensation product of isophthalic acid, 4,4-bis(4-hydroxyphenyl) pentanoic acid, ricinoleic acid, fumaric acid, pentaerythritol, and trimethylol ethane.

References Cited

UNITED STATES PATENTS

| 2,499,004 | 2/1950 | Seil et al. | |
| 2,543,727 | 2/1951 | Lecture et al. | 106—28 |
| 2,590,654 | 3/1952 | Schmutzler. | |
| 2,907,736 | 10/1959 | Greenlee | 260—22 |

FOREIGN PATENTS

| 151,784 | 6/1953 | Australia. |
| 153,408 | 9/1953 | Australia. |

DONALD E. CZAJA, *Primary Examiner.*

JAMES A. SEIDLECK, LEON J. BERCOVITZ, *Examiners.*

R. W. GRIFFIN, *Assistant Examiner.*